(12) United States Patent
Thomas et al.

(10) Patent No.: US 10,701,874 B2
(45) Date of Patent: Jul. 7, 2020

(54) POT FLOWER

(71) Applicants: Roosevelt Thomas, Phoenix, IL (US); Judy Robinson, Phoenix, IL (US)

(72) Inventors: Roosevelt Thomas, Phoenix, IL (US); Judy Robinson, Phoenix, IL (US)

( * ) Notice: Subject to any disclaimer, the term of this patent is extended or adjusted under 35 U.S.C. 154(b) by 137 days.

(21) Appl. No.: 15/709,898

(22) Filed: Sep. 20, 2017

(65) Prior Publication Data

US 2018/0084743 A1 Mar. 29, 2018

Related U.S. Application Data

(60) Provisional application No. 62/397,887, filed on Sep. 21, 2016.

(51) Int. Cl.
*A01G 27/00* (2006.01)
*A01G 9/02* (2018.01)
*A01G 27/02* (2006.01)

(52) U.S. Cl.
CPC ............. *A01G 27/00* (2013.01); *A01G 9/02* (2013.01); *A01G 27/02* (2013.01)

(58) Field of Classification Search
CPC .......... A01G 9/02; A01G 9/027; A01G 27/00; A01G 27/02
See application file for complete search history.

(56) References Cited

U.S. PATENT DOCUMENTS

| | | | | |
|---|---|---|---|---|
| 2,072,185 A | * | 3/1937 | Schein | A01G 27/005 47/81 |
| 4,651,468 A | * | 3/1987 | Martinez | A01G 27/00 47/48.5 |
| 4,991,345 A | * | 2/1991 | Bloch | A01G 27/00 47/65.5 |
| 5,052,149 A | * | 10/1991 | Johnson | A01G 27/00 222/181.3 |
| 5,113,618 A | * | 5/1992 | Rigsby | A01G 27/00 47/71 |
| 5,272,835 A | * | 12/1993 | Stern | A01G 27/02 47/79 |
| 5,315,783 A | * | 5/1994 | Peng | A01G 27/00 47/31.1 |
| 2010/0031568 A1 | * | 2/2010 | Burnett | A01G 9/02 47/66.1 |
| 2015/0007498 A1 | * | 1/2015 | Hensley | A01G 31/02 47/62 R |
| 2017/0188527 A1 | * | 7/2017 | Gordon | A01G 22/00 |
| 2017/0188528 A1 | * | 7/2017 | Gordon | A01G 27/005 |

* cited by examiner

*Primary Examiner* — Monica L Williams
*Assistant Examiner* — Aaron M Rodziwicz
(74) *Attorney, Agent, or Firm* — Michael J. Foycik, Jr.

(57) ABSTRACT

A pot flower which features a unique, internal catch-basin or reservoir designed to collect, store, and dispense upon demand water, minerals, and fertilizer which have been applied and have run through the potting soil.

5 Claims, 1 Drawing Sheet

POT FLOWER

CROSS REFERENCE TO RELATED APPLICATIONS

This application claims the priority of Provisional Application No. 62/397,887 filed on Sep. 21, 2016, inventors Roosevelt Thomas and Judy Robinson, entitled "POT FLOWER". The entire disclosure of this provisional patent application is hereby incorporated by reference thereto, in its entirety.

STATEMENT REGARDING FEDERALLY SPONSORED RESEARCH OR DEVELOPMENT

Not applicable.

FIELD OF THE INVENTION

The present invention pertains to flower pots, and more specifically to the field of a line of flower pots, each of which features a unique, internal catch-basin or reservoir designed to collect, store, and dispense upon demand water, minerals, and fertilizer which have been applied and have run through the potting soil.

BACKGROUND OF THE INVENTION

It is a problem in the art to provide a plant pot with a mechanism to catch excess water and plant food that has run through soil in the pot.

It is also a problem in the art to provide plant pot with mechanism to effectively catch, store and reuse nutrients filled runoff water.

SUMMARY OF THE INVENTION

From the foregoing, it is seen that it is a problem in the art to provide plant pot with mechanism to catch excess water and plant food run through soil in the pot. According to the present invention, a line of plant pot is provided which features a unique, internal catch-basin or reservoir designed to collect, store, and dispense upon demand water, minerals, and fertilizer which have been applied and have run through the potting soil.

The invention includes a pot flower which has a container body, an inside space, and a hose. The inside space holds potting soil. The container body includes a side wall, a base portion, a top edge, an inside surface, and a bottom 18, and thereby forms an enclosure which encloses the interior space. The container body also includes a hose rest which is a holding member for holding the open end of the hose so that liquid does not run out.

FIG. 2 is a schematic sectional side view of the pot flower 100 of FIG. 1. This illustrates the interior of the container body 10, showing a bottom interior wall 72 bounded by an interior side wall 74. An interior screen 50 is disposed above the bottom interior wall 72. The region between the interior screen 50, the interior side wall 74, and the bottom interior wall 72 forms an interior reservoir 70. The hose rest 40 has a tip 42 shaped to fit into a tip 34 of the hose 30 to secure the hose 30 so that liquid does not escape from the interior reservoir 70 and also so that the body 10 can be conveniently stored, transported, or moved. In FIG. 2, the tip 34 of the hose 30 is not connected to the tip 42, so that liquid can drain out of the interior reservoir 70.

DETAILED DESCRIPTION OF THE INVENTION

Figure 1:
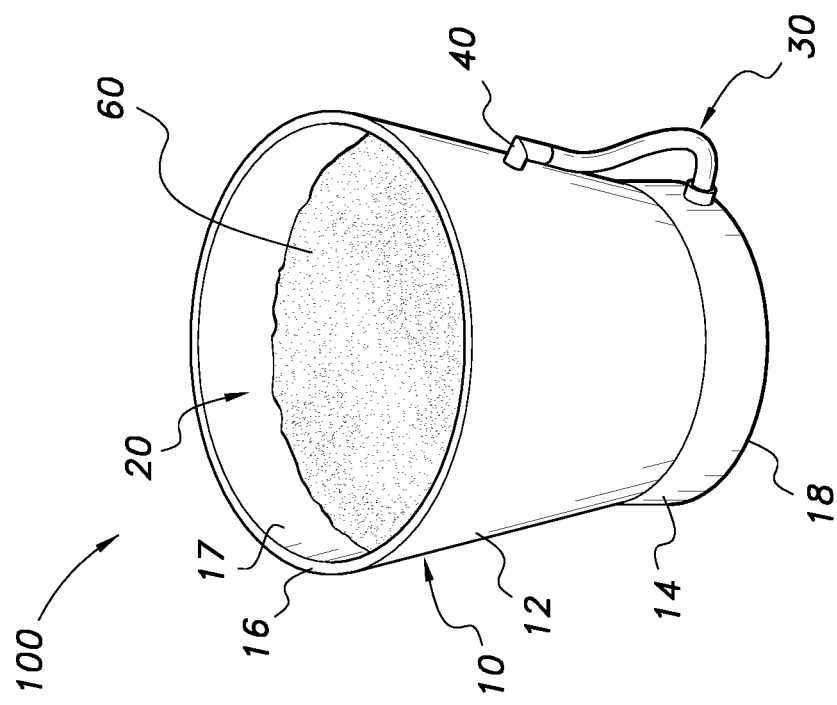
FIG. 1 a top perspective view illustrating a pot flower, constructed in accordance with the present invention.

FIG. 1 a top perspective view illustrating a pot flower 100, constructed in accordance with the present invention. Here, the pot flower 100 has a container body 10, an inside space 20, and a hose 30. The inside space 20 holds potting soil 60.

The container body 10 includes an upper portion bounded by a side wall 12, a base portion 14, a top edge 16, an inside surface 17, and a bottom 18, and thereby forms an enclosure which encloses the interior space 20. The container body 10 also includes a hose rest 40 which is a holding member which in FIG. 1 is holding the open end of the hose 30.

Figure 2:
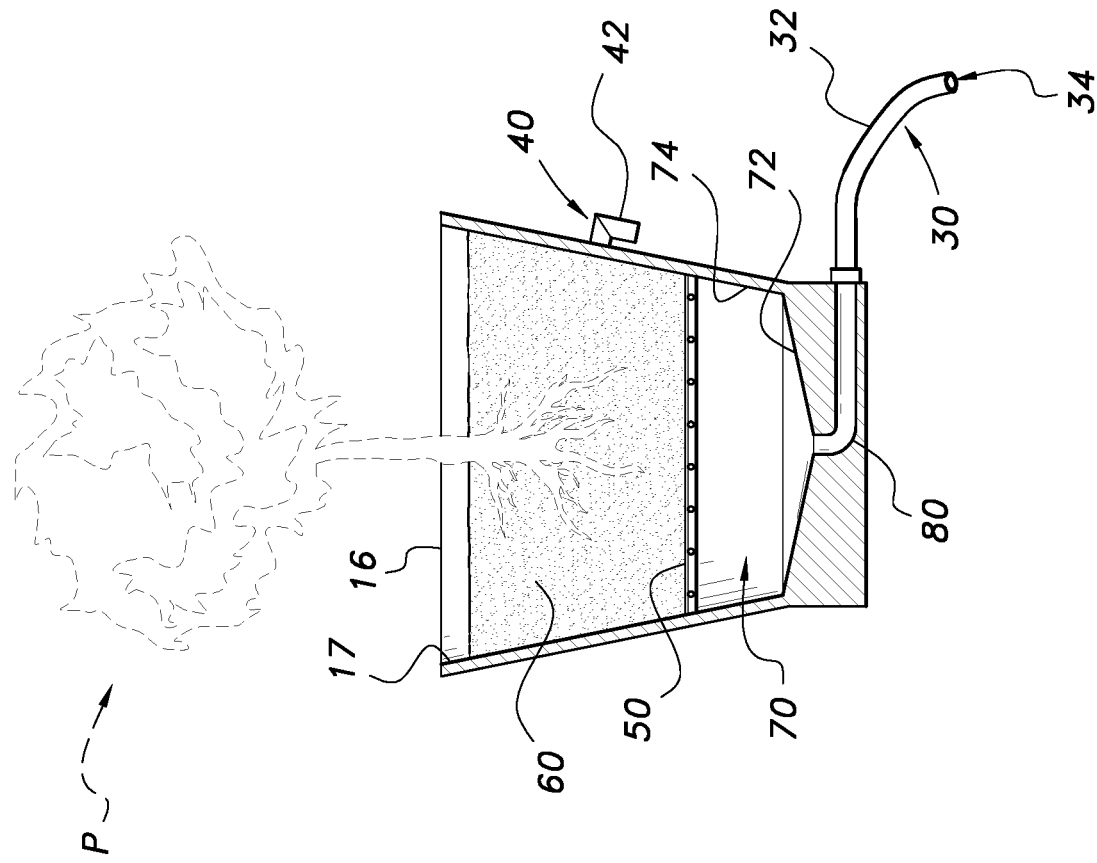
FIG. 2 is a sectional side view of the pot flower of FIG. 1, constructed in accordance with the present invention.

FIG. 2 is a schematic sectional side view of the pot flower 100 of FIG. 1. This illustrates the interior of the container body 10, showing a bottom interior wall 72 bounded by an interior side wall 74. An interior screen 50 is disposed above the bottom interior wall 72. The region between the interior screen 50, the interior side wall 74, and the bottom interior wall 72 forms an interior reservoir 70. The hose rest 40 has a tip 42 shaped to fit into a tip 34 of the hose 30 to secure the hose 30 so that liquid does not escape from the interior reservoir 70 and also so that the body 10 can be conveniently stored, transported, or moved. In FIG. 2, the tip 34 of the hose 30 is not connected to the tip 42, so that liquid can drain out of the interior reservoir 70.

The hose rest 40 can be a simple solid member, or it can be a stop cock. The purpose of the hose rest 40 is primarily to hold the tip 34 of the hose 30 above the interior reservoir 70, i.e. above the screen 50. The screen 50 holds the potting soil 60 above the interior reservoir 70, and allows liquid such as nutrient-rich water to flow therethrough.

The base portion 14 includes the bottom wall 18 and the bottom interior wall 72 therein, and also includes a channel 80 which communicates between the interior reservoir 70 and an exterior of the body 10 at a location where the hose 30 is coupled. The channel 80 can be molded with the body 10 such as by use of a multi-part mold or other molding method. It is also possible to produce the channel 80 by drilling or boring operations, or to form it by 3D printing of the body 10. All such methods, and any others which would be known to any one having skill in the molding and machining arts, are contemplated as being within the scope of the present invention.

The channel 80 allows nutrient-rich liquid to flow from the interior reservoir 70 to the hose 30 and out through the tip 34 of the hose 30.

The hose 30 has a body 32 which is preferably a hollow tube, and includes the opening 34. The hose rest 40 has a terminal stop-cock valve 42 in the preferred embodiment.

The interior reservoir 70 has a conically sloped bottom 72 and a curved side wall 74 which itself is conically-sloped. A plant P is shown in phantom outline in FIG. 2, representing a growing plant that is rooted in the soil 60.

As shown in FIG. 1 and FIG. 2, the pot flower 100 of the present invention can be a line of flower pots, ranging from small pots for indoor plants to large planters for outdoor plants, each of which features a unique, internal catch basin or reservoir 70 designed to collect, store, and dispense upon demand water, minerals, and fertilizer which have been applied and have run through the potting soil.

The Pot Flower system can be produced in a variety of materials and in a large variety of sizes, colors, and configurations. In terms of materials, small indoor pots are produced in molded thermoplastic, while larger outdoor pots and planters are produced in sealed terra-cotta and other non-porous ceramics. In each case, however, the basic design is the same. The pot or planter has a screen-type grid or drain which supports the potting soil and the plant, and which allows water and dissolved nutrients to drain through the potting soil and the plant's root system. The water and dissolved nutrients not taken up by the plant's roots will move through the screen drain (50), and collect in a concealed, internal reservoir or catch basin (70) at the bottom of the pot or planter.

This reservoir 70, in premium models of the Pot Flower, has a clear acrylic window panel through which the gardener could monitor the reservoir's fill-level. At the bottom of the reservoir or holding tank 70, the flexible drain hose 30, equipped with the terminal stop-cock valve 40, extends and runs through the molded channel or recess 80 in the base of the pot or planter 10 and along the side, where its molded channel or recess holds it in place when not in use. When the reservoir or holding tank 70 is full, the gardener simply employs the hose 30 to drain the reservoir into a suitable watering vessel, and recycles this nutrient-rich drain water to water and nourish the plant, or any other plant.

The line of Pot Flower stands (not shown) include the drain, reservoir, and dispensing hose, mounted atop decorative three-leg, four-leg, and solid bases. The present invention is contemplated as including all types of pot stands which would be known to any one having skill in the agriculture arts and work support arts. The Pot Flower stands accommodate and support conventional flower pots, placing the drain, reservoir, and dispensing hose beneath them, and provide the same vital function and benefit of the Pot Flower pots and planters.

In the Pot Flower, then, gardeners and plant-lovers have a simple, well-designed system for retaining and recycling water, nutrient minerals, and fertilizers that are otherwise largely wasted as they drain through a conventional flower pot or planter. Since the water and dissolved nutrients are retained within the Pot Flower's reservoir and catch-basin, and re-dispensed through the Pot Flower's hose, these materials can be put to use repeatedly for maximum efficiency and benefit. Thus, the Pot Flower saves gardeners considerably on the cost of plant-foods, fertilizers, and water, and wring from these essentials all the nurturing benefit that they provide the growing plant. Designed and produced for both interior (houseplant) and exterior use with gardens and ornamental potted plants, the Pot Flower design can be incorporated not only into flower pots, but also large and extensive planter-boxes, window-box planters, and large outdoor pots. Such a range and variety equips the Pot Flower to meet and satisfy an extensive and varied market, including not only households but also a wide variety of commercial and institutional establishments.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

What is claimed is:

1. A plant container for growing plants, comprising:
    a container body having an upper portion adapted for holding soil, a lower portion adapted for containing liquid, and a base portion; said upper portion of said container body having a side wall; said side wall of said container body bounding said upper portion and said lower portion; and
    said side wall connecting said upper portion, said lower portion, and said base portion;
    said base portion of said container body having a bottom wall;
    a screen disposed inside said upper portion adapted to retain soil, said screen being spaced apart from said bottom wall of said base portion;
    said lower portion of said container body having an inside space adapted for containing liquid that drains downwardly from said screen, said inside space being bounded by said screen, said bottom wall of said base portion, and said side wall of said container body, wherein said inside space is a reservoir for liquid; and
    said side wall in said base portion having a passage therethrough, said passage being disposed in said side wall at a location adjacent to said bottom wall;
    said passage formed in said base portion having an inlet opening that communicates with said inside space and having an outlet opening which communicates with an exterior of said container body; whereby excess liquid that drains through said screen passes into said inside space is recycled and reused by draining the liquid from said inside space to the exterior of said container body through said passage.

2. A plant container as claimed in claim 1, further comprising a hose connected to said outlet opening of said passage, for conveying liquid out of said reservoir.

3. A plant container as claimed in claim 2, further comprising a hose rest disposed on an exterior side of said container body, said hose rest being adapted to support and hold an end of said hose; said hose rest being disposed at a position along said side wall of said container body adjacent to a location adjacent to said screen.

4. A plant container as claimed in claim 3, wherein said hose has a hose tip which is disposed at a distal end of said hose from said outlet opening; and
    wherein from said hose rest has a tip for engaging said hose rest.

5. A plant container as claimed in claim 4, wherein said hose rest is disposed at a vertical elevation above said inside space, so that liquid does not exit from said hose tip when said hose tip is disposed on said hose rest.

* * * * *